United States Patent [19]

Benvenuto

[11] Patent Number: 4,586,235
[45] Date of Patent: May 6, 1986

[54] PALLET STRIPPER APPARATUS

[76] Inventor: Enzo Benvenuto, 9145 Sandpiper Ct., Orland Park, Ill. 60462

[21] Appl. No.: 711,986

[22] Filed: Mar. 14, 1985

[51] Int. Cl.[4] .................................................. B23P 19/04
[52] U.S. Cl. .................................... 29/564.3; 29/239; 29/253; 83/582; 83/925 R
[58] Field of Search ................. 29/564.3, 564.1, 33 R, 29/566.1, 239, 252, 253; 83/582, 925 R

[56] References Cited

U.S. PATENT DOCUMENTS

| | | | |
|---|---|---|---|
| 2,593,843 | 4/1952 | Cannon | 29/33 R |
| 3,512,242 | 5/1970 | Haruis | 29/252 |
| 3,651,584 | 3/1972 | Herbert | 29/564.1 |
| 3,740,815 | 6/1973 | Campbell et al. | 29/200 |
| 3,846,890 | 11/1974 | Bielkiewicz | 29/200 |
| 3,869,783 | 3/1975 | Spencer | 29/244 |
| 3,899,816 | 8/1975 | Jennings | 29/200 |
| 3,916,498 | 11/1975 | Lopez et al. | 29/200 |
| 3,991,459 | 11/1976 | Rapp | 29/252 |
| 4,051,588 | 10/1977 | Conkle | 29/252 |
| 4,089,098 | 5/1978 | DeMarco | 29/239 |
| 4,112,578 | 9/1978 | Sanford | 29/700 |
| 4,152,819 | 5/1979 | Conkle | 29/252 |
| 4,241,495 | 12/1980 | Wakeem | 29/700 |
| 4,285,110 | 8/1981 | Fagre, Jr. | 29/252 |
| 4,320,570 | 3/1982 | Williams | 29/564 |
| 4,346,506 | 8/1982 | Martindale | 29/239 |
| 4,392,403 | 7/1983 | Martindale, Jr. | 83/418 |
| 4,433,464 | 2/1984 | Hebert | 29/564.1 X |
| 4,435,892 | 3/1984 | Williams | 29/239 |

OTHER PUBLICATIONS

Advertisement re Pallet Service Company; 1983 Buyers' Guide, The Pallet Digest.
Advertisement re Rogers Associates; 1983 Buyers' Guide, The Pallet Digest.

Primary Examiner—William R. Briggs
Attorney, Agent, or Firm—Welsh & Katz, Ltd.

[57] ABSTRACT

A pallet stripper apparatus includes a pair of guide arm assemblies each of which includes a pair of guide arms pivotally supported for movement between closely spaced generally parallel positions and outwardly biased inclined positions. The guide arm assemblies define lead ends adapted to be inserted into an open end of a pallet between opposing pallet boards such that transverse shear blades carried by the guide arm assemblies are automatically positioned to shear the pallet board fasteners at the interface of the pallet boards with associated runners.

17 Claims, 7 Drawing Figures

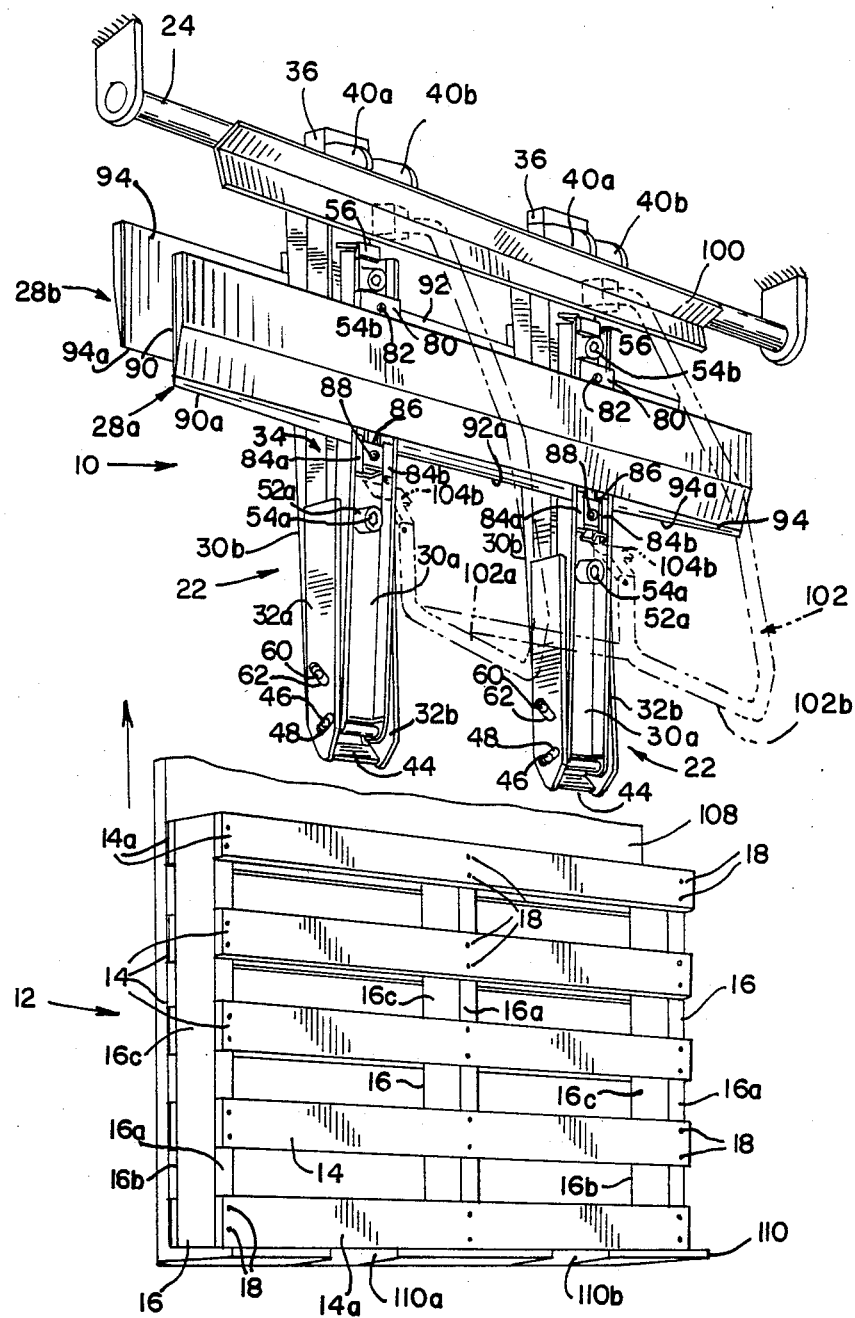

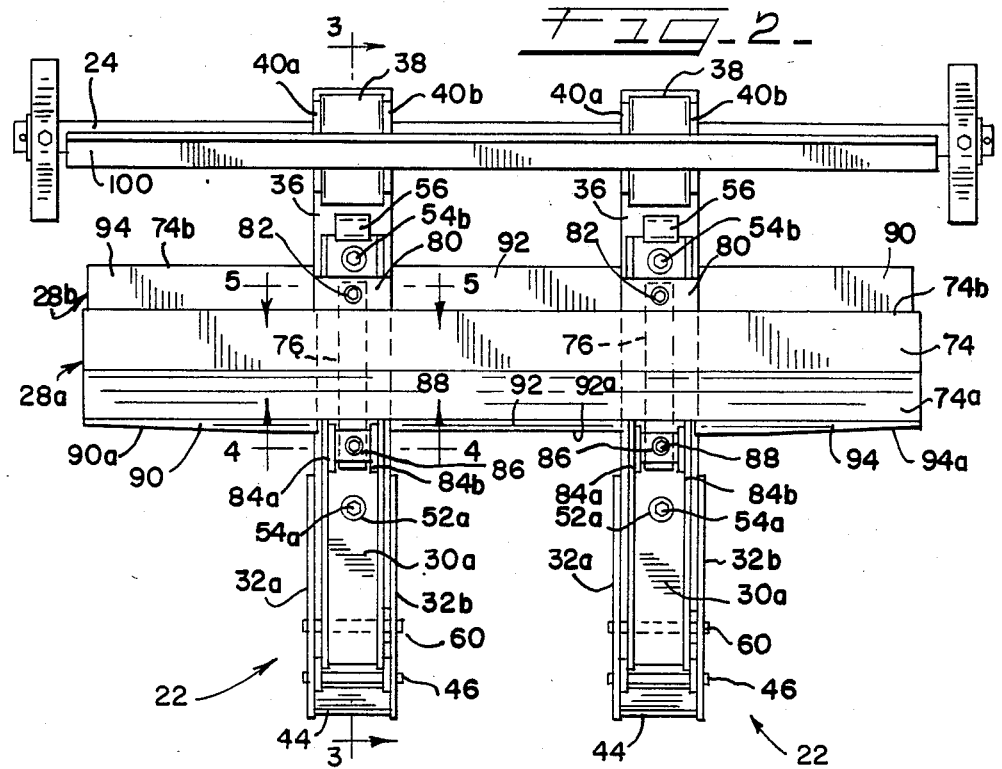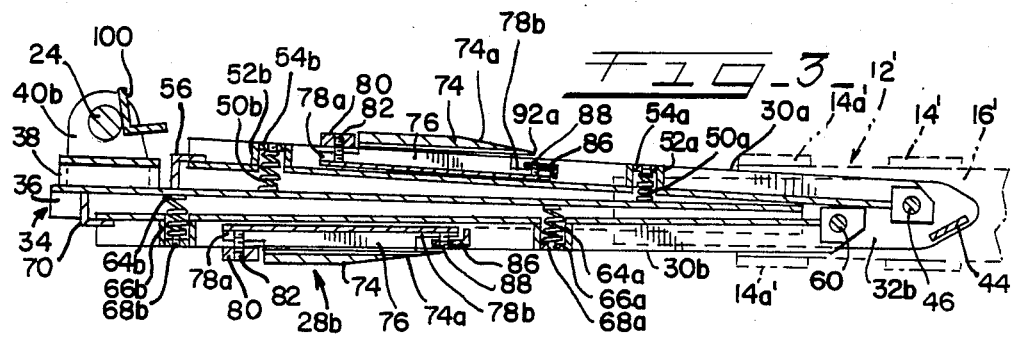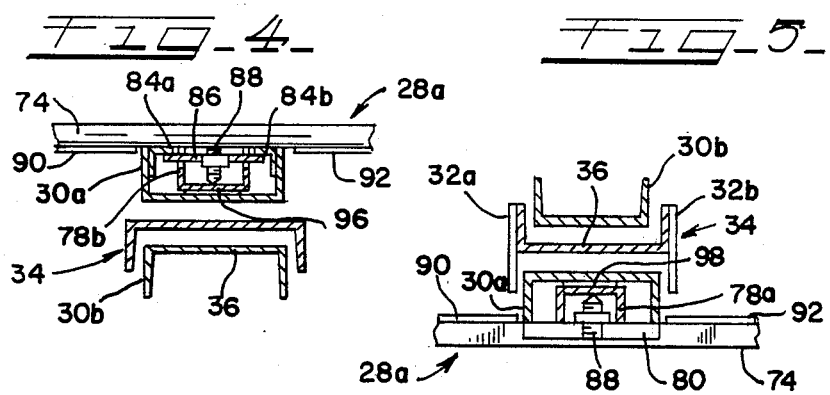

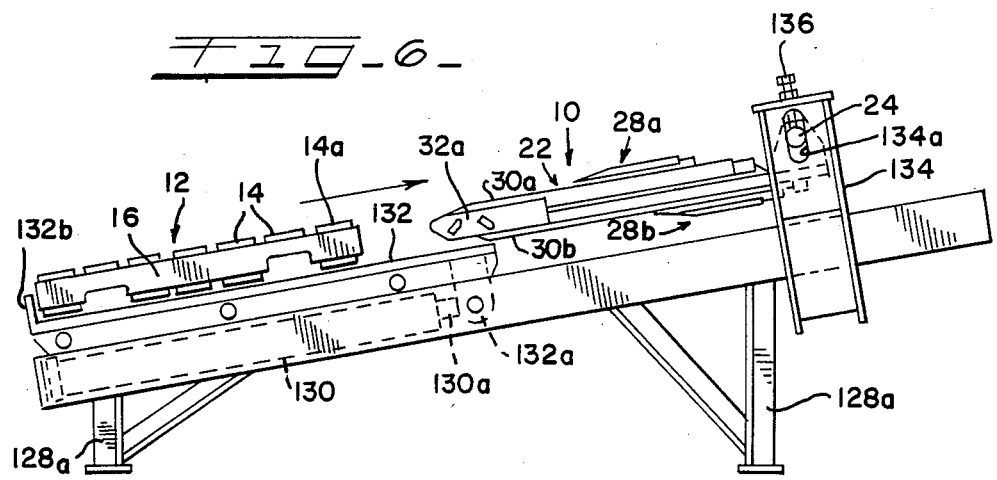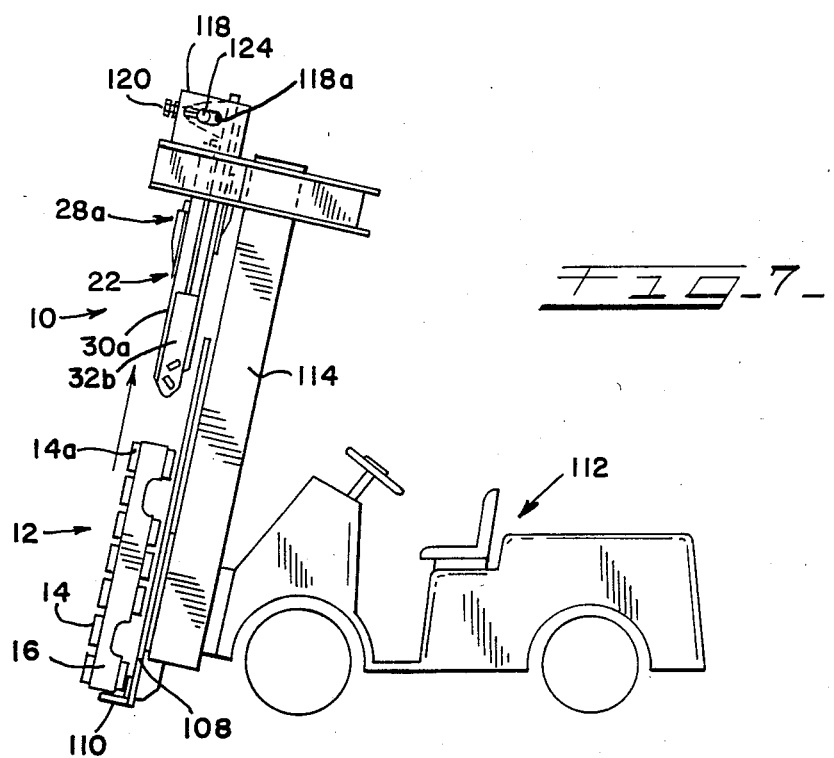

PALLET STRIPPER APPARATUS

BACKGROUND OF THE INVENTION

The present invention relates generally to apparatus for disassembling or stripping wooden pallets, and more particularly to a novel pallet stripper apparatus adapted to automatically accommodate variations in pallet size while simultaneously stripping the pallet boards from the runners.

In recent years, the cost of hardwood lumber for use in pallet construction has increased dramatically. As a result, damaged and used pallets which have heretofore frequently been disposed of without concern for salvage of any components have been subject to greater discretion and salvage efforts. Thus, recycling of pallets so as to enable reuse of both the salvageable longitudinal runners or stringers and the transverse pallet boards has become an economic expedient. The necessity for salvaging reusable components of pallets is expected to become more critical in the future due to both depletion of the sources of hardwood and the cost of hardwood.

Another factor which plays an important role in the decision of whether to salvage a pallet is the labor factor. It will be appreciated that where substantial manual labor time is necessary to disassemble a pallet, the cost of such manual labor may become prohibitive. In an attempt to overcome these problems, machines have been developed to disassemble wooden pallets which eliminate much of the hand labor previously required. A significant drawback in the known pallet disassembling or stripping machines is that they are generally incapable of self-adjustment to accommodate different size pallets, or are relatively complex in construction and therefore costly to manufacture.

SUMMARY OF THE INVENTION

A general object of the present invention is to provide a novel apparatus for disassembling or stripping wooden pallets which is sturdy in construction and requires minimal manual labor.

A more particular object of the present invention is to provide a novel pallet stripping apparatus which employs elongated shearing blades and associated guide arms adapted to automatically position the shearing blades so as to shear nail fasteners or the like securing pallet boards to runners and thereby strip the pallet boards from the runners.

Another object of the present invention lies in the provision of a pallet stripper apparatus which includes a pair of guide arm assemblies each of which includes two guide arms supported for pivotal movement relative to each other between positions in relatively close side-by-side relation and generally outwardly inclined V-shaped positions, the guide arms of each pair being biased toward their outward positions and being adapted to be received between pallet boards mounted on opposite longitudinal mounting surfaces of spaced runners, the pairs of guide arms supporting front and rear transverse shear blades which are automatically positioned to enter the interface between the pallet boards and associated runners so as to effect shearing of the pallet board fastener nails or the like irrespective of variations in size of the runners within a predetermined range.

A feature of the pallet stripper apparatus in accordance with the invention lies in the provision of elongated shear blades adapted to place the pallet board fastener nails in axial tension simultaneously with shearing of the nails.

Another feature of the pallet stripper apparatus in accordance with the invention lies in the ability to adjust the shear blades relative to the associated guide arms so as to effect optimum shear blade positioning for a particular pallet size and configuration.

Still another feature of the pallet stripper apparatus in accordance with the invention lies in its adaptability for use in either a vertical, diagonal, or horizontal orientation so as to be readily adapted for use in different type pallet stripping systems.

Further objects, advantages and features of the invention, together with the organization and manner of operation thereof, will become apparent from the following detailed description of the invention when taken in conjunction with the accompanying drawings wherein like reference numerals designate like elements throughout the several views.

BRIEF DESCRIPTION OF DRAWINGS

FIG. 1 is a perspective view illustrating a pallet stripper apparatus in accordance with the present invention preparatory to removal of pallet boards from a pallet;

FIG. 2 is a front elevational view of the pallet stripper apparatus illustrated in FIG. 1;

FIG. 3 is a longitudinal sectional view through one of the guide arm assemblies and associated shear blades taken substantially along line 3—3 of FIG. 2 and looking in the direction of the arrows;

FIG. 4 is a fragmentary transverse sectional view taken substantially along line 4—4 of FIG. 2 and looking in the direction of the arrows;

FIG. 5 is a fragmentary transverse sectional view taken substantially along line 5—5 of FIG. 2, looking in the direction of the arrows;

FIG. 6 is a side elevational view of a pallet stripping system utilizing a pallet stripper apparatus in accordance with the present invention; and FIG. 7 is a side elevational view illustrating a pallet stripping system employing a pallet stripper in accordance with the invention mounted on a forklift type vehicle operative to effect relative movement between the pallet stripper apparatus and a pallet to be stripped.

DESCRIPTION OF PREFERRED EMBODIMENT

Referring now to the drawings, and in particular to FIGS. 1 and 2, a pallet stripper apparatus for disassembling wooden pallets and the like is indicated generally at 10. The pallet stripper apparatus 10, which may alternatively be termed a pallet disassembling or stripping machine, is adapted for cooperation with a conventional wooden pallet, such as indicated generally at 12 in FIG. 1, in a manner to remove or strip pallet boards 14 from runners or stringers 16. For purposes of description, the three equally spaced wooden runners 16 are defined as extending longitudinally of the pallet 12 and have a plurality of transverse pallet boards 14 secured to opposite longitudinal mounting surfaces 16a and 16b of the runners by suitable fastener means such as nails, screws, staples or other suitable connecting means, indicated at 18, adapted to be driven through the pallet boards into the underlying runners such that the fastening means extend through the interface between the pallet boards and each runner. The distance between corresponding oppositely mounted pallet boards 14 is equal to the transverse dimension, termed the height, of the side surfaces 16c of the runners 16 which are of substantially equal size. In the illustrated embodiment, the ends of the pallet 12 are open between the corresponding end pallet boards, indicated at 14a, so as to allow entry of the lift forks or tongues of a fork lift truck type vehicle within either end of the pallet for lifting and/or transport, as is known.

The pallet 16 illustrated in FIG. 1 comprises what is termed a two-way pallet; that is, the lift forks of a fork lift vehicle may be inserted from either of the two open ends of the pallet. As will become apparent, the pallet stripper apparatus 10 may also be employed in stripping or disassembling four-way pallets as illustrated in FIGS. 6 and 7 as well as pallets of varying widths, heights and lengths and having pallet boards of different thicknesses. Other types of similar carrier platforms, such as skids, tops, block type and plywood deck pallets, which employ a plurality of longitudinal runners on which one or more transverse boards or sheets are mounted may also be stripped with the apparatus 10.

Very generally, the pallet stripper apparatus 10 includes guide arm means in the form of a pair of substantially identical guide arm assemblies each of which is indicated generally at 22. In the embodiment illustrated in FIG. 1, each guide arm assembly 22 is supported by and suspended from a generally horizontal stationary support bar or shaft 24. The lower ends of the guide arm assemblies 22 define lead-in ends which are adapted to enter the open end of a pallet 12 between the corresponding end pallet boards 14a upon predetermined relative movement between the pallet stripper apparatus and the pallet. The guide arm assemblies 22 cooperate to support a pair of transverse shear blade assemblies, indicated generally at 28a and 28b, which are caused to automatically enter each interface between each successive pallet board 14 and the underlying runner mounting surfaces 16a, b and effect shearing of the corresponding fastening means 18 as continued relative movement between the guide arm assemblies and the pallet is effected. In this manner, each sucessive pallet board on both sides of the runners is released or disassembled from the runners. As will be described, the illustrated embodiment of the pallet stripper apparatus 10 is such that the shear blade assemblies 28a, b can remove all of the pallet boards 14 from both sides of the runners 16 of a conventional size pallet. However, only one of the blade assemblies 28a, b need be employed if it is desired to remove the pallet boards from only one side of the pallet 12, or if a skid or the like having boards on only one side of a pair of runners is to be disassembled or stripped.

Turning now to a more detailed description of the pallet stripper apparatus 10, and with reference to FIGS. 3–5, taken in conjunction with FIGS. 1 and 2, each of the guide arm assemblies 22 includes a pair of guide arms 30a and 30b which may take the form of elongated suitable strength structural C-shaped channels. The lower end of each guide arm 30a, b, as considered in FIGS. 1 and 2, is pivotally connected to and supported by and between a pair of parallel support plates 32a and 32b which form part of a corresponding elongated support frame, indicated generally at 34. Each of the support frames 34 includes a generally C-shaped structural channel 36 having the corresponding support plates 32a, b suitably affixed to its lower end, as by welding. The upper end of each support frame 34 has a generally C-shaped channel bracket 38 affixed to its web portion, as by welding, on which is mounted a pair of outwardly extending mounting plates 40a and 40b having axially aligned apertures which receive the support bar 24 in fixed relation therethrough so as to support the guide arm assemblies 22 in substantially parallel spaced relation. The lower ends of the support plates 32a and 32b are preferably formed with generally V-shaped lead-in edge surfaces as shown. A reinforcing plate or strap 44 is preferably secured to and between each pair of support plates 32a, b at the lower ends thereof so as to provide strength and rigidity.

Each of the guide arms 30a is pivotally connected to and between the associated support plates 32a, b through a transverse pivot pin 46 which is affixed to the lower end of the guide arm and extends outwardly through aligned elongated slots one of which is illustrated at 48 in FIG. 1, in the support plates 32a, b. In this manner, each guide arm 30a is adapted for outward pivotal movement about its pivot pin axis 46 relative to the associated support frame 34. Each support arm 30a is biased outwardly from its support frame 34 through biasing means in the form of a pair of coil compression springs 50a and 50b having first ends received within generally cylindrical spring pockets 52a and 52b, respectively, and having their opposite ends in abutting relation against the web of the corresponding channel frame 36. An adjustable stop, such as a hollow head set screw, is threaded onto each spring pocket 52a, b, as indicated at 54a and 54b, and acts against the corresponding compression spring 50a or 50b so as to enable selective varying of the bias force acting outwardly on the guide arm 30a. Outward pivotal movement of each guide arm 30a relative to its associated support frame 34 is limited by a generally L-shaped stop 56 affixed to the support frame 34 in a manner to overlie the upper end of the associated guide arm 30a, as illustrated in FIG. 3.

In similar fashion, each guide arm 30b is pivotally supported on its associated support frame 34 through a transverse pivot pin 60 fixed transversely to the lower end of the guide arm and extending through aligned elongated slots formed in the corresponding support plates 32a, b, as indicated at 62 in FIG. 1. Each pivot pin 60 is mounted in upwardly spaced parallel relation from the corresponding pivot pin 46 such that the associated guide arm 30b is slightly elevated from the corresponding opposite guide arm 30a, thereby facilitating closer positioning of the guide arms of each pair of guide arms 30a, b relative to each other and accommodating upward spacing of the rearward shear blade assembly 28b relative to the corresponding forward shear blade assembly 28a.

Each guide arm 30b is similarly biased outwardly from its corresponding support frame 34 by coil compression springs 64a and 64b which are received within spring pockets 66a and 66b, respectively, and bear against adjustable set screws or caps 68a and 68b threaded internally of the spring pockets so as to facilitate selective adjustment of the biasing force urging the arms 30b outwardly from their associated support frame. An L-shaped stop 70 is mounted on each of the support frames 34 so as to extend outwardly from the side thereof opposite the corresponding stop 56, and cooperates with the corresponding guide arm 30b to limit outward pivotal movement thereof relative to its support frame.

As thus described, the lower or lead-in ends of the guide arm assemblies 22 are configured to enable insertion into an open end of a pallet, such as indicated in phantom at 12' in FIG. 3, between the edge pallet boards 14'a such that the edge pallet boards engage the outwardly inclined edges of the guide arms 30a and 30b and cause inward pivotal movement of the guide arms against the bias of their associated compression springs 50a, b and 64a, b upon continued insertion of the guide arm assemblies into the pallet.

As aforementioned, the guide arm assemblies 22 cooperate to support the shear blade assemblies 28a and 28b such that the shear blade assemblies extend in transverse relation to the guide arm assemblies. The shear blade assemblies 28a, b are substantially identical and each includes an elongated generally rectangular shear blade support member 74 having a lower inclined or wedge-shaped outwardly facing surface 74a and an upper edge surface 74b. Each blade support member 74 has a pair of generally C-shaped mounting channels 76 secured in transverse relation to its inner surface such that the mounting channels on each blade support member are adapted to be received within the corresponding laterally spaced guide arms 30a or 30b when the blade support members are centered relative to the guide arm assemblies. As illustrated in FIG. 2, each blade support member 74 extends substantially an equal distance laterally outwardly from each guide arm assembly.

Each of the mounting channels 76 is relieved or cut away at its opposite ends, such as indicated at 78a and 78b, respectively, in FIG. 3. This enables the upper end 78a of each mounting channel 76 to be inserted upwardly behind a rectangular stop member 80 affixed to the forwardly extending flanges of the corresponding C-shaped guide arms 30a or 30b such that the stop members are engaged by the upper edge 74b of the corresponding blade support member 74, and thus act as an upper stop for the blade support member. A set screw 82 is threaded within a suitable aperture in stop member 80 generally centrally thereof and is adapted for selective inward adjustment inward to engage the rearwardly lying mounting channel end 78a and cause the rearward surface of the associated blade support member 74 to be locked against the forwardly extending flanges on the corresponding guide arm 30a or 30b. As will be described, a shim may be inserted between the web of each mounting channel end 78a and the web of the associated guide arm 30a, b so as to selectively position the blade supports 74 outwardly from the associated guide arms.

The lower end 78b of each of the mounting channels 76 is adapted to be received between laterally opposed generally L-shaped brackets 84a and 84b which are affixed, as by welding, to the laterally opposed flanges of the corresponding guide arm 30a or 30b spaced a predetermined distance from the corresponding stop member 80. After the lower ends 78b of the mounting channels 76 are so positioned, a generally rectangular locking plate 86 is positioned such that its opposite marginal edges lie rearwardly of the L-shaped brackets 84a, b and forwardly of the relieved end 78b of the associated mounting channel 76. A hollow head set screw 88 is mounted within a suitable threaded aperture centrally of each locking plate 86 and is adapted to be threaded inwardly against the web of the rearwardly lying mounting channel end 76b so as to cause the rearward surface of the corresponding blade support member to abut the rearwardly lying flange edges of the corresponding guide arm 30a or 30b. A shim may be similarly positioned between the mounting channel end 78b and the associated guide arm 30a, b to selectively position the corresponding lower edge of the blade support 74 outwardly from the guide arms, as desired.

In the illustrated embodiment, each of the blade support members 74 has shear blade means in the form of three generally planar shear blade sections, indicated at 90, 92 and 94, affixed to its rearward or inner surface so as to establish downwardly exposed shear edges 90a, 92a and 94a, respectively, which are generally contiguous to and extend below the lower horizontal edges of the corresponding beveled surfaces 74a on the blade support members. The shear blade sections 90a and 94a are affixed, respectively, to the rearward surfaces of the portions of the blade support members 74 which extend laterally outwardly from the associated guide arms 30a and 30b of the guide arm assemblies, while each shear blade section 92 is affixed to the rearward surface of the portion of the corresponding blade support which extends between the corresponding guide arms 30a and 30b. As illustrated in the front elevational view of FIG. 2, the shear edges 90a and 94a are preferably beveled or inclined upwardly toward their outermost ends relative to the horizontal intermediate shear edge 92a so as to effect a sliding shear or cutting action on a nail or other fastener means securing the pallet boards to the runners during a pallet stripping operation. While the shear blade sections 90, 92 and 94 in the illustrated embodiment are sized to be slightly greater in area than the associated blade support members 74, it will be understood that the shear blades need not extend over the full rear surface of the blade support members.

As aforementioned, and in accordance with one feature of the pallet stripping apparatus 10, the shear blade support members 74 and associated shearing blades 90, 92 and 94 are adapted to be adjusted outwardly relative to their respective guide arms 30a and 30b so as to enable selective positioning of the shear edges 90a, 92a and 94a relative to the plane of the outermost edges of the guide arm channels. With particular reference to FIG. 4, and taking the shear blade assembly 28a as exemplary, a shim 96 may be positioned between the web of the mounting channel end 78a and the adjacent web of the guide arm 30a such that tightening the set screw 88 against the mounting channel web locks the mounting channel against the shim rather than causing abutment of the rearward surface of the blade support member 74 against the outer edges of the guide arm 30a. Similarly, a shim 98 of selected thickness may be inserted between each mounting channel end 78b and the associated rear. In this manner, selection of different thickness shims for placement between each mounting channel 76 and the associated guide arm 30a or 30b enables selective positioning of the shear blade support members 74 and associated shear blades relative to the plane of the outermost edge surfaces of the guide arms. It has been found desirable to position the shear edges 90a, 92a and 94a such that they are either coplanar with the outermost surfaces of the associated guide arms 30a, or 30b, or are spaced outwardly therefrom a distance of approximately 1/16 inch.

Preferably, an elongated generally L-shaped stop member 100 is affixed along the length of the support bar 24 in a position to be engaged by any pallet board severed during a stripping operation which does not drop downwardly, the stop member serving to separate the stripped pallet board from the pallet stripping apparatus and thereby prevent jamming. A pallet board catch frame, illustrated in phantom at 102 in FIG. 1, is mounted on and suspended from the pallet stop member 100 so as to receive stripped pallet boards 14 when severed by the forward shear blade assembly 28a. The catch frame 102 has parallel lower catch arms 102a and 102b having flap type stops 104a and 104b suitably pivotably connected to upwardly extending portions of the arms 102a, b so as to allow upward movement of pallet boards but prevent any stripped pallet board from falling downwardly without being caught by the catch frame.

The pallet stripping apparatus 10 is particularly adapted for use in various types of pallet stripping systems to facilitate stripping of the pallet boards from a pallet. FIG. 1 illustrates a pallet stripping system wherein the pallet stripper apparatus 10 is mounted on and suspended from a fixed support bar 24 as aforenoted. The pallet 12 to be stripped is mounted on an upwardly moveable pallet support or carriage 108 having a lower forwardly extending flange 110 on which the pallet rests in edgewise relation. The flange 110 is recessed at 110a and 110b to accommodate passage therethrough of the guide arm assemblies 22 during a pallet stripping operation. The carriage 108 may be interconnected to the double acting lift cylinder or ram (not shown) of a conventional lift fork vehicle, such as indicated generally at 112 in FIG. 7, so that the pallet support carriage is moved upwardly along a generally upstanding mast 114 of the vehicle upon upward extension of the lift cylinder piston (not shown) which is supported generally longitudinally of the mast. A pair of laterally spaced support channels, one of which is indicated at 116 in FIG. 7, are secured to the upper end of the mast 114 in normal relation thereto and each supports an upstanding support plate 118 having an elongated slot 118 formed therein. The aligned slots 118 are adapted to receive and support the opposite ends of a support rod 24 of a pallet stripper apparatus 10 so as to maintain the stripper apparatus parallel to the mast and facilitate adjustment of the support shaft 24 along the lengths of the elongated slots through associated turning screws 120.

Upward extension of the lift cylinder or ram of the lift truck 112 will cause upward movement of the associated pallet 12 so as to effect entry of the guide arm assemblies 22 between the opposing upper edge pallet boards 14a. Continued relative movement between the pallet and stripper apparatus causes the innertop edges of the pallet boards to engage the outer edges of the guide arms 30a and 30b and urge them inwardly against the action of their biasing springs so that the shear edges 90a, 92a and 94a of the shearing blades are automatically positioned to enter at the interface of the pallet boards with the associated runners. Such continued relative movement between the pallet and pallet stripping apparatus causes the shear edges to sever or shear the nails or other fastening means at each interface between the pallet boards and associated runners. In this action, the inclined or wedge surfaces 74a on the shear blade support member 74 initially urge the pallet boards outwardly from the associated runners and thereby place the nails in tension which is believed to effect a more efficient transverse shear of the nails.

FIG. 6 illustrates an alternative system, indicated generally at 126, employing a pallet stripper apparatus 10 in accordance with the present invention. As shown in FIG. 6, the system 124 includes an upwardly inclined bed or framework 126 which is supported on upstanding pairs of legs 128a and 128b. The bed or framework 126 supports a double acting pneumatic or hydraulic ram or cylinder 130 along its longitudinal length. The ram 130 has an extendable piston 130a to the outer end of which is attached an arm 132a of a pallet support carriage 132 adapted to receive and support a pallet, such as indicated at 12', thereon such an upwardly extending flange 132b on the carriage abuts the pallet and moves it upwardly upon extension of the piston 130a.

A pallet stripper apparatus 10 employed in the system of FIG. 6 may be supported in similar fashion to the system illustrated in FIG. 7 in that a pair of support channels, one of which is indicated at 134, are affixed to the framework 126 so as to extend upwardly therefrom in normal relation. The laterally spaced support channels 134 have elongated slots 134a formed therethrough which receive a support rod 24 affixed to the pallet stripper 10 in a manner to support the pallet stripper apparatus in substantially parallel relation to the framework 126 while allowing selective relative movement therebetween through turnscrews 136. In this manner, selective extension of the ram piston 130a effects relative movement between a pallet 12 and the pallet stripper apparatus 10 so as to effect entry of the guide arms 30a and 30b between the forward opposite pallet boards 14' which, as previously described, serves to effect positioning of the forward shear edges of the shear blade assemblies 28a and 28b so as to shear the nails or other fastener means securing the pallet boards to the associated runners 16. The pallet moving or feed ram 126 may, alternatively, comprise a chain drive, screw drive, rack and pinion drive, or other suitable feed means.

As aforementioned, if desired, the shear blade assembly 28b may be eliminated so that the pallet boards on a selected side of the pallet are removed or disassembled from the associated runners.

While a preferred embodiment of the pallet stripper apparatus in accordance with the present invention has been described along with various alternate systems employing the pallet stripper apparatus, it will be understood that changes and modifications may be made therein without departing from the invention in its broader aspects. Various features of the invention are defined in the following claims.

What is claimed is:
1. Apparatus for stripping pallets of the type which include at least two runners having opposite longitudinal mounting surfaces, and a plurality of pallet boards affixed to each of the opposite mounting surfaces by shearable fastener means which pass through the interface between each pallet board and the runners; said apparatus comprising, in combination, guide arm means including at least one pair of guide arms defining leading ends, means supporting said pair of guide arms for pivotal movement relative to each other between generally parallel positions and outwardly inclined positions forming a generally V-shaped relation therebetween, means biasing said guide arms toward their said outwardly inclined positions, and at least one elongated shearing blade supported by a selected one of said guide arms in transverse relation thereon, said shearing blade being operative to shear the fastening means at the interface of the pallet boards mounted on the corresponding selected ones of said runner mounting surfaces during relative movement between said pallet stripping apparatus and a pallet such that the lead ends of said guide arms are introduced between pallet boards on opposite mounting surfaces of the runner.

2. A pallet stripping apparatus as defined in claim 1 wherein said guide arm means includes two substantially similar pairs of said guide arms, said support means supporting said pairs of guide arms in similar fashion and in generally parallel relation, and an elongated shearing blade supported by and extending generally transversely of corresponding guide arms on each pair of said guide arms.

3. A pallet stripping apparatus as defined in claim 2 wherein each of said shearing blades extends between and laterally outwardly from each of its corresponding guide arms.

4. A pallet stripping apparatus as defined in claim 2 wherein said shearing blades are positioned such that a selected one of the shearing blades effects a shearing action prior to shearing by the other shearing blade during stripping of pallet boards.

5. A pallet stripping apparatus as defined in claim 3 wherein each of said shearing blades defines shearing edges which are non-linear across the full length thereof.

6. A pallet stripping apparatus as defined in claim 1 wherein said biasing means is adjustable to enable variation in the biasing force acting outwardly on each of said guide arms.

7. A pallet stripping apparatus as defined in claim 2 wherein said elongated shearing blades are supported by said guide arms so as to facilitate adjustable mounting thereon in a direction substantially perpendicular to the corresponding guide arms.

8. A pallet stripping apparatus as defined in claim 2 including an elongated blade support member mounted on the corresponding guide arms of each of said pairs of guide arms so as to extend transversely thereof, and including at least one of said shearing blades mounted on each of said blade support members in a position to define an exposed shearing edge directed toward the lead ends of said guide arms.

9. A pallet stripping apparatus as defined in claim 8 wherein each of said shear blade support members supports a plurality of shearing blades along its longitudinal length.

10. A pallet stripping apparatus as defined in claim 2 wherein said guide arm support means supports each of said pairs of guide arms so as to facilitate relative movement between the lead end of each guide arm and said support means.

11. A pallet stripping apparatus as defined in claim 1 including means for receiving pallet boards after being stripped from a pallet runner by said shearing blade.

12. A pallet stripping apparatus as defined in claim 11 wherein said pallet board receiving means includes a board receiving and support frame supported on said pivot arm support means.

13. A pallet stripping apparatus as defined in claim 2 for use with a pallet including at least two parallel spaced runners having a plurality of pallet boards affixed transversely to opposite substantially parallel mounting surfaces on the runners, and wherein said pairs of said guide arms define leading ends adapted to be received between corresponding pallet boards secured on opposite mounting surfaces of the runners, said shear blades being carried by said guide arms such that relative movement between the stripping apparatus and a pallet so as to effect entry of the guide arms between said corresponding pallet boards causes the shear blades to enter the interface between the pallet boards and the mounting surfaces on the runners and shear the corresponding fastener means whereby to release the pallet boards from the runner.

14. A pallet stripping apparatus as defined in claim 13 including an elongated support member supported by corresponding guide arms on each pair of guide arms, and at least one shear blade mounted on each of said support members so as to establish an exposed shearing edge directed toward the lead ends of said guide arms, and means supporting said support members on said guide arms in a manner to facilitate selective positioning of said shearing edges relative to the corresponding guide arms.

15. A system for stripping pallets of the type which include at least two runners having opposite longitudinal mounting surfaces, and a plurality of pallet boards affixed to each of the opposite mounting surfaces by shearable fastener means which pass through the interface between each pallet board and the runners; said system comprising, in combination, pallet stripper apparatus including guide arm means having at least one pair of guide arms defining leading ends, means supporting said pair of guide arms for pivotal movement relative to each other between generally parallel positions and outwardly inclined positions forming a generally V-shaped relation therebetween, means biasing said guide arms toward their said outwardly inclined positions, and at least one elongated shearing blade supported by a selected one of said guide arms in transverse relation thereon, pallet support means for supporting a pallet in a plane generally coplanar with a median plane passing between said guide arms when in their said generally parallel positions and with corresponding pallet boards adjacent one end of the pallet positioned to receive the leading ends of said guide arms therebetween, and feed means for effecting relative movement between said pallet support means and said stripper apparatus so as to effect entry of said lead ends of said guide arms between said corresponding pallet boards in a manner to effect shearing of the fastener means at the interface of at least one of said corresponding pallet boards with the associated runners.

16. A system as defined in claim 15 including a support mast having means adapted to support said stripper apparatus and said pallet support means, said mast being adapted for selective positioning relative to vertical and being operative to effect said relative movement between said pallet support means and said stripper apparatus.

17. A system as defined in claim 15 wherein said feed means includes reciprocating conveyor means defining an inclined path along which a pallet is moved during said relative movement between said pallet support means and said stripper apparatus.

* * * * *